United States Patent [19]
Johns et al.

[11] Patent Number: 5,696,947
[45] Date of Patent: Dec. 9, 1997

[54] TWO DIMENSIONAL FRAME BUFFER MEMORY INTERFACE SYSTEM AND METHOD OF OPERATION THEREOF

[75] Inventors: Charles R. Johns; John T. Roberson, both of Austin, Tex.

[73] Assignee: International Business Machines Corporation, Armonk, N.Y.

[21] Appl. No.: 560,610

[22] Filed: Nov. 20, 1995

[51] Int. Cl.[6] .................................................. G06F 12/06
[52] U.S. Cl. ........................ 395/517; 395/521; 395/509; 345/190; 345/185
[58] Field of Search .................................. 395/509, 511, 395/517, 520, 521; 345/185, 189, 190, 200, 201, 203

[56] References Cited

U.S. PATENT DOCUMENTS

| | | | |
|---|---|---|---|
| 5,185,599 | 2/1993 | Doornink et al. | 395/143 |
| 5,239,654 | 8/1993 | Ing-Simmons et al. | 395/800 |
| 5,343,425 | 8/1994 | Saito et al. | 365/189.01 |
| 5,361,370 | 11/1994 | Sprague et al. | 395/800 |
| 5,371,517 | 12/1994 | Izzi et al. | 345/199 |
| 5,544,306 | 8/1996 | Deering et al. | 345/185 |
| 5,572,655 | 11/1996 | Tuljapurkar et al. | 345/189 |

OTHER PUBLICATIONS

"Fast DRAMs can be swapped for SRAM caches" by Drive Bupsky Electronic Design, Jul. 22, 1993.

*Primary Examiner*—Kee M. Tung
*Attorney, Agent, or Firm*—Volel Emile; Brian F. Russell; Andrew J. Dillon

[57] ABSTRACT

A two dimensional frame buffer memory interface structure is provided. The interface comprises a parallel data bus, a control signal bus, a data cache, and a controller. The parallel data bus transfers a set of pixel data in parallel to the data cache. The control signal bus transfers to the controller a X strobe signal, a Y strobe signal, and a mode signal indicating an interface mode specifying a designated pattern for the pixel data transferred over the parallel data bus. The data cache, controlled by the controller and connected to the parallel data bus, compiles each set of pixel data received over the parallel data bus into the designated pattern of pixels, as indicated by the mode signal. The controller transfers each set of pixel data from the data cache to a two dimensional frame buffer to be stored in the designated pattern at a calculated address, wherein an address in the two dimensional frame buffer is specified by an X address and a Y address and wherein the calculated address for a given set of pixel data is an X address equal to the X address of a previous set of pixel data plus, when a X strobe signal is received for the given set of pixel data, an X increment associated with the indicated interface mode, and a Y address equal to a Y address of the previous set of pixel data plus, when a Y strobe signal is received for the given set of pixel data, a Y increment associated with the indicated interface mode.

24 Claims, 4 Drawing Sheets

TWO DIMENSIONAL FRAME BUFFER MEMORY INTERFACE SYSTEM AND METHOD OF OPERATION THEREOF

BACKGROUND OF THE INVENTION

1. Technical Field

The present invention relates in general to graphics display systems, and in particular to computer graphics display systems. Still more particularly, the present invention relates to a graphics system memory interface structure and frame buffer memory system.

2. Description of the Related Art

In traditional graphical systems, image data that defines geometric objects such as a polygon are generated by an application program executing in the computer system. This image data is represented as Cartesian coordinates or as vectors that may be manipulated by a graphics processor in the computer system through the geometrical transformations of scaling, translating, and rotating. In order to render the graphic image, modern graphic systems paint a large number of polygons on the screen to construct a complicated object. Vertices of each polygon has associated coordinate values (X, Y) and colors (R, G, B). High-end graphics adapters can take just the vertex data of these polygons and proceed to render the interiors properly with linear interpolation of the colors and the depths. Low-end graphics adapters cannot render the polygon directly, so advanced software interpolation of the polygons is utilized to produce standard pixel data that then can be processed by the low-end graphics adapter. This process of rendering a graphics image by converting polygons to individual sets of pixels is referred to as rasterization.

Once received by a graphics adapter, an image to be displayed is divided into a number of discrete picture elements or pixels. Each pixel represents a physical position on the output display monitor and can have associated with it a color or specific shade of gray. In image and graphics systems, the pixels of a display are each represented by a value stored in a memory device. This memory device storing this representation of a display is typically referred to as a frame buffer. A high resolution display typically has an image of 1280×1024 or 1,310,720 pixels. Each pixel value can be represented by 1 to 32 or more bits, thus requiring a large amount of memory to store the image. This requirement for large amounts of high speed memory requires the use of high density memory devices, such as Dynamic Random Access Memories ("DRAMs").

The nature of video display scan patterns and update rates requires decoupling the updating of the frame buffer from the scanning out of the stored values (through video generation circuitry) for display on the video monitor. Consequently, a specialized form of DRAM memories, called Video RAMs (VRAMs), were developed for simultaneously displaying the contents of a graphics frame buffer to the screen, while allowing the graphics or image processor to update the frame buffer with new data. Video RAMs contain two Input/Output ports (one for random access and one for serial access) and one address port. These memories are frequently referred to as dual-port memories.

Therefore, the graphics controller (also referred to as a graphics processor) transfers the rasterized graphic image in the form of pixel data to the graphics subsystem frame buffer memory (VRAM). As is common in graphics display subsystems, the graphics controller is connected to the frame buffer memory by an address bus and a data bus over which the graphics processor transfers the image pixel data to the frame buffer memory. The data bus and address bus are received at a frame buffer memory interface structure that compiles received pixel data and transfers the pixels to the frame buffer memory for storage. Current frame buffer memory interfaces are linear address/data interfaces. Thus, the received pixel data is interpreted as a linear stream of pixels along a span.

However, graphics display subsystems render an image by producing pixels within a two dimensional image coordinate space. Further, almost all frame buffer memories are two dimensional storage devices. Consequently, downloading a two dimensional image from the graphics generation hardware to the two dimensional frame buffer memory over a linear memory interface results in a communication bottleneck. The overall graphics system performance is thus limited by the bandwidth available across the memory interface. Moreover, with each new set of pixel data transferred over the data bus, a new address or partial address is required in most systems. This further slows the memory update. As can be seen, these linear frame buffer memory interface structures currently available in graphics display subsystems are not well suited to graphics controllers and frame buffer memories rendering two dimensional pixel images.

SUMMARY OF THE INVENTION

According to the present invention, a two dimensional frame buffer memory interface structure is provided. The interface comprises a parallel data bus, a control signal bus, a data cache, and a controller. The parallel data bus transfers a set of pixel data in parallel to the data cache. The control signal bus transfers to the controller a X strobe signal, a Y strobe signal, and a mode signal indicating an interface mode specifying a designated pattern for the pixel data transferred over the parallel data bus. The data cache, controlled by the controller and connected to the parallel data bus, compiles each set of pixel data received over the parallel data bus into the designated pattern of pixels, as indicated by the mode signal. The controller transfers each set of pixel data from the data cache to a two dimensional frame buffer to be stored in the designated pattern at a calculated address, wherein an address in the two dimensional frame buffer is specified by an X address and a Y address and wherein the calculated address for a given set of pixel data is an X address equal to the X address of a previous set of pixel data plus, when a X strobe signal is received for the given set of pixel data, an X increment associated with the indicated interface mode, and a Y address equal to a Y address of the previous set of pixel data plus, when a Y strobe signal is received for the given set of pixel data, a Y increment associated with the indicated interface mode. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
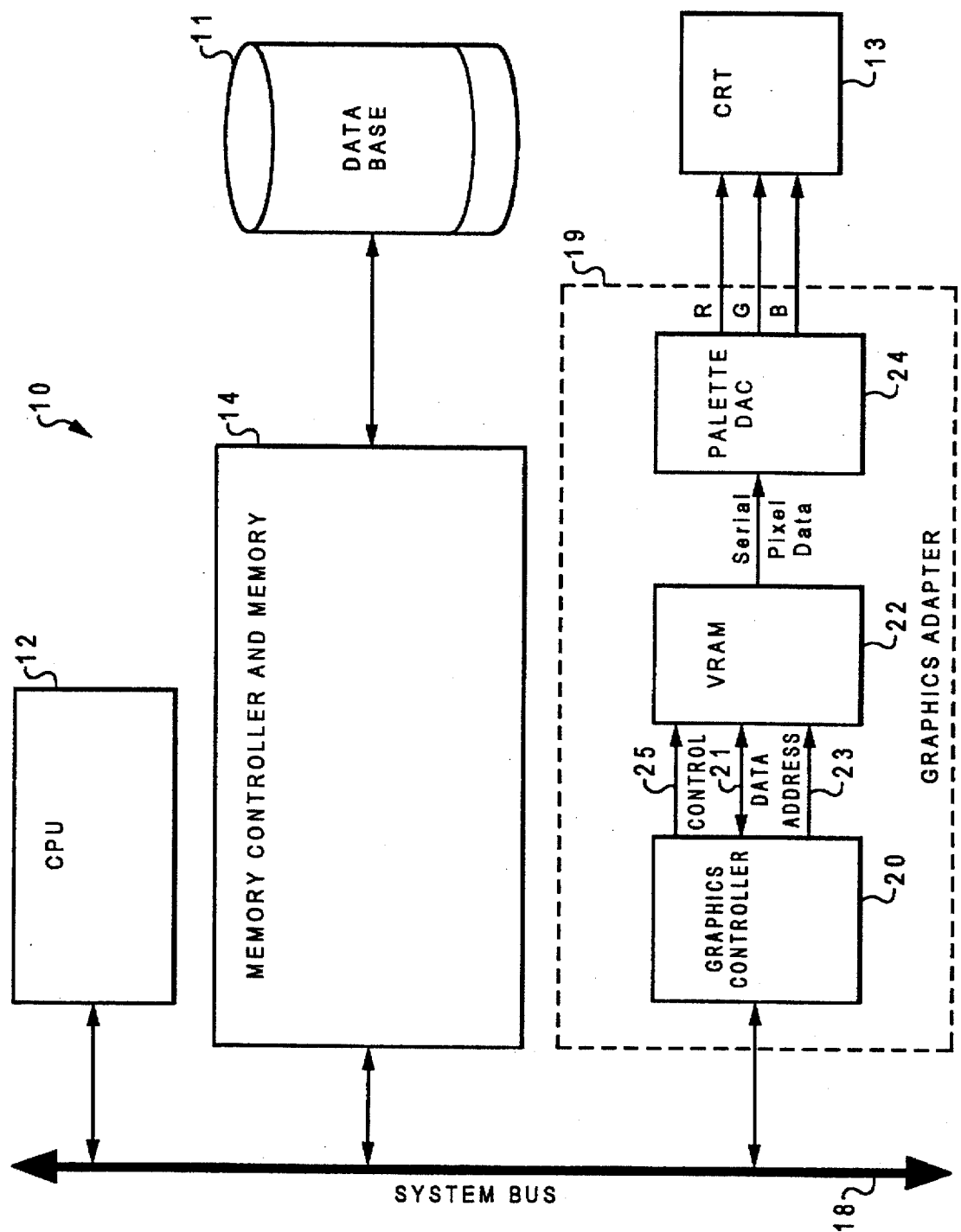
FIG. 1 shows a data processing system for providing a graphics display of graphics information on a two-dimensional display screen, in accordance with the present invention.

With reference to the figures, and in particular, with reference to FIG. 1, there is shown a data processing system for providing a graphics display of graphics information on a two-dimensional display screen, in accordance with the present invention. A host data processing system, shown generally at 10, receives vertex data (graphics data) from a suitable database 11, which would be embodied in a disk drive or CD-ROM drive for example, wherein the graphics data defines an overall image which is to be displayed as a two-dimensional image on a cathode ray tube (CRT) raster display screen 13. The host data processing system 10 may include, for example, a host processor or central processing unit (CPU) 12, memory controller 14, and graphics adapter 19, each of which is connected to system bus 18 for transferring instructions and data between connected devices.

The host processor or central processing unit (CPU) 12 executes a graphics application program that derives images from the image data in database 11. Memory controller 14 controls access to database 11 by the graphics application. CPU 12 has specialized graphics processing capabilities for generating display pixel data describing the location, color, and intensity of each point which makes up the overall image which is to be displayed. Memory controller 14 transfers display pixel data to graphics adapter 19, which comprises graphics controller 20, video random access memory (VRAM) 22, and Palette DAC 24, to process the pixels for display on a 2-D raster display (CRT 13). Graphics controller 20 receives the pixel data, and transmits display pixel data, addressing information, and control signals to update graphics memory (VRAM) 22. Graphics controller 20 transmits pixel data over a 32-bit data bus 21 to update the frame buffer memory (VRAM 22). Graphics controller 20 also provides row and column address information for the pixel data on a 9-bit address bus 23, and outputs a set of control signals, including a Row Access Strobe (RAS), a Column Access Strobe (CAS), and Output Enable, a number of Write Enables, and an Interface Mode Signal on control signal bus 25. VRAM 22 provides serial pixel data on a serial data bus to Palette DAC ("RAMDAC") 24. Palette DAC 24 processes the received display pixel data and converts it into analog signals (RGB signals) that drive the attached display device 13 for presentation as a visual image.

Figure 2:
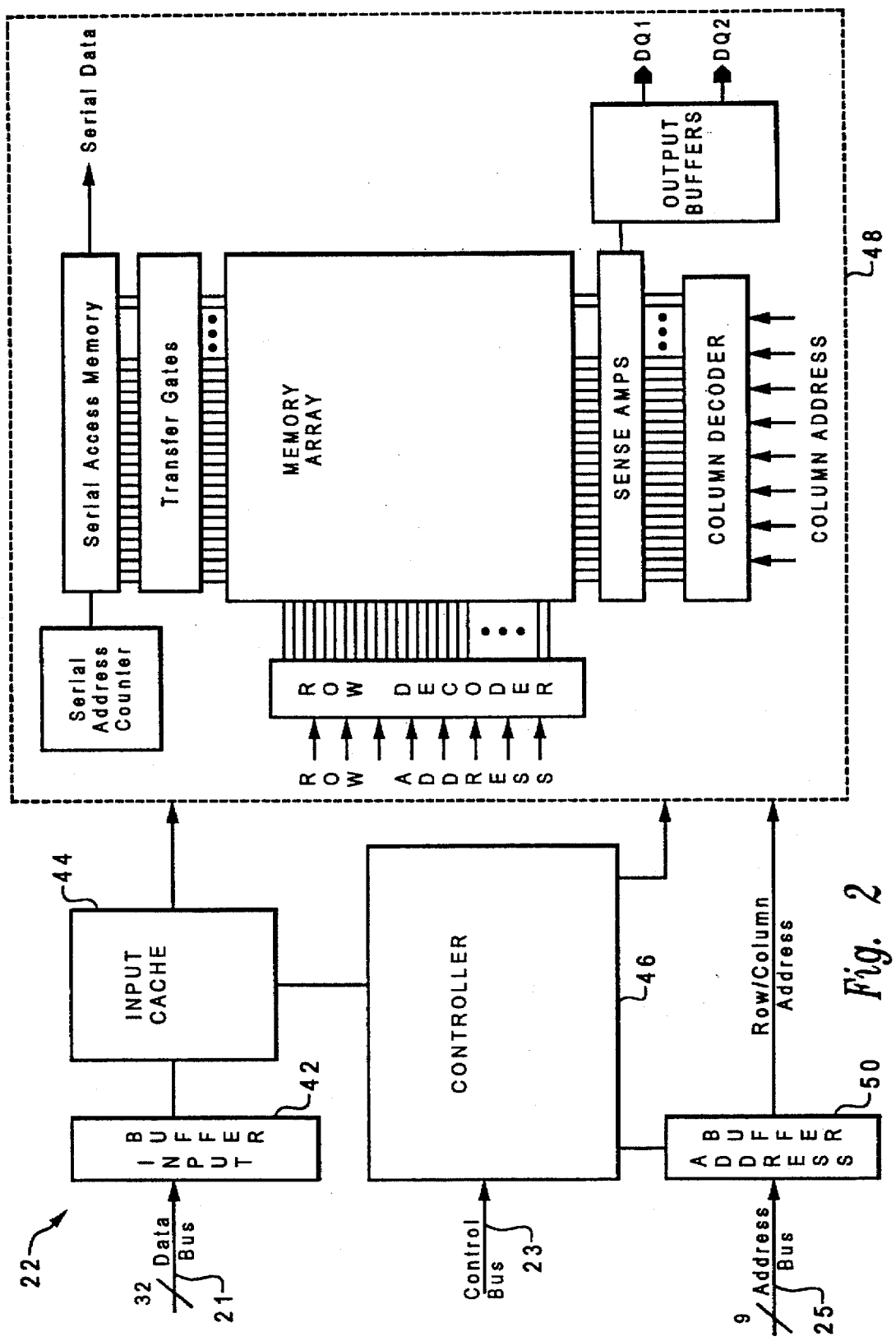
FIG. 2 shows a more detailed block diagram of the frame buffer memory and two dimensional interface structure, in accordance with a preferred embodiment of the present invention.

Referring to FIG. 2, there is shown a more detailed block diagram of the frame buffer memory, including a two dimensional interface structure, in accordance with a preferred embodiment of the present invention. The frame buffer interface structure comprises input buffer 42, input cache 44, controller 46, address buffer 50, control bus 23, address bus 25 and data bus 21. The frame buffer memory (VRAM), shown generally at 22, receives digital pixel data over the 32-bit parallel data bus 21. Each set of 32 bits is latched into input buffer 42 and then transferred to input cache 44. Controller 46 receives a X strobe signal, a Y strobe signal, and a mode signal, which indicates an interface mode for the current set of pixel data being transferred over data bus 21 to buffer 42. This interface mode specifies a designated pattern for the pixel data transferred over the parallel data bus. Thus, for example, the memory data bus may be providing the actual pixel data or may be transmitting a group of pixel enables.

If the data bus 21 is transferring actual pixel data from the graphics processor, the number of pixels transferred over the data bus per set of pixel data is dependant upon the number of bits per pixel and the data width of the data bus (i.e., number of parallel bits). For example, if the 32-bit data bus 21 transfers 8 bit-per-pixel values, each set of pixel data transferred over the data bus would contain 4 pixels. These 4 pixels would be latched in buffer 42 and transferred to input cache 44 where the parallel digital data is compiled into four 8 bit pixels.

If the set of pixel data is providing pixel enables, input cache 44 compiles a set of 32 pixels for storage in memory array 48. The actual pixel color value is generated on the memory device by transferring to input cache 44 a pixel color value from a color register for each enabled pixel. In one embodiment, a disabled enable bit causes no change to the corresponding pixel. In another embodiment, a second pixel color value stored in a second color register is stored at each of the disabled pixel locations of input cache 44. As can be seen, the use of data enables on the bus greatly increases the bandwidth available over the interface. The enables are interpreted such that an active bit indicates a single constant color that is written to the frame buffer memory, while an inactive bit indicates no change or second constant color for the corresponding pixel. A more advanced memory device could also contain color interpolation hardware. A base and increment value would be set up in the memory. Each active enable bit would then direct the storage of the next incremental color value at the corresponding memory location.

The mode signal received by controller 46 places the frame buffer memory interface into either a span or an array mode of operation. The span mode has both a horizontal and a vertical sub-mode. The horizontal span mode allows a string of pixels in the X direction to be updated in the memory. The vertical span mode allows a string of pixels in the Y direction to be updated. The length of the span update is limited by the data bus bit width, or data width, of the data bus 21. As opposed to receiving an interface mode signal, the interface mode can be set via a control register that is written to by a write operation to change the interface mode.

In the array mode of operation, the pixel data latched in buffer 42 is compiled by input cache 44 as an array of pixels. In one embodiment, the array mode defines the data bus bit width to represent enables for a N×M rectangular group of pixels. For example, the 32-bit data bus 21 could transfer an array of 8 pixels wide by 4 pixels high (or any other N×M array that did not exceed 32), when data enables are transferred. If 8 bit-per-pixel values are being transferred on the 32-bit data bus, a two pixel wide by two pixel high array could be transferred and compiled into the data cache memory as an array.

When a first set of pixel data is transferred to the frame buffer memory, an initial address is transferred over the n-bit parallel address bus 25 to address buffer 50. This initial address is transferred to controller 46 to select the storage location within memory array 48 for the compiled pixel data in input cache 44. Controller 46 then stores the set of pixel data from input cache 44 to a storage location in memory array 48 indicated by the initial address received over address bus 25.

In accordance with the present invention, the pattern by which the set of pixels is stored in memory array 48 is dependant upon the type of interface mode indicated by the mode signal. The mode signal indicates an interface mode of either a span or an array mode of operation. This interface mode will specify a designated pattern for the pixel data transferred over the parallel bus and how that designated pattern of pixels are to be stored in the memory array 48. The span mode has both a horizontal and a vertical sub-mode. Moreover, in both the span mode and array mode, a significant increase in performance can be obtained by organizing memory array 48 in a tiled fashion. Using this technique, the memory would be mapped into the display screen image such that sequential writes in the horizontal, vertical or diagonal direction will stay within the same memory locality of the memory array 48. Thus, for example, a rectangular region of the screen would be mapped to a row of the memory array. This mapping avoids the row access penalty for writes that leave the "page". As will be appreciated, this memory mapping will not be necessary in memory technology that provides the same access time for any location in the array, such as SRAM.

Memory array 48 is a two dimensional frame buffer memory such as a DRAM or a SRAM that stores data in a two dimensional array of memory having rows (X direction) and columns (Y direction). In the span mode, the storage address transferred from controller 46 indicates the location of storage for the set of pixel data by a X address and a Y address, which specifies the storage location for the first pixel of the span of pixels being stored to the array. The horizontal span mode allows a string of pixels transferred over data bus 21 and compiled into input cache 44 to be stored in memory array 48 as a line of pixels in the X direction of memory array 48. The length of the update is constrained by the data bus bit width. If the mode signal indicates the vertical span mode, the pixels compiled in input cache 44 are stored in the Y direction, or a column of memory array 48. Once again, the length of the vertical update is constrained by the data width of data bus 21. In the array mode, an array of pixels is stored to memory array 48. This array is compiled in input cache 44 and is stored in memory array 48 at the location indicated by controller 46.

Figure 3A:
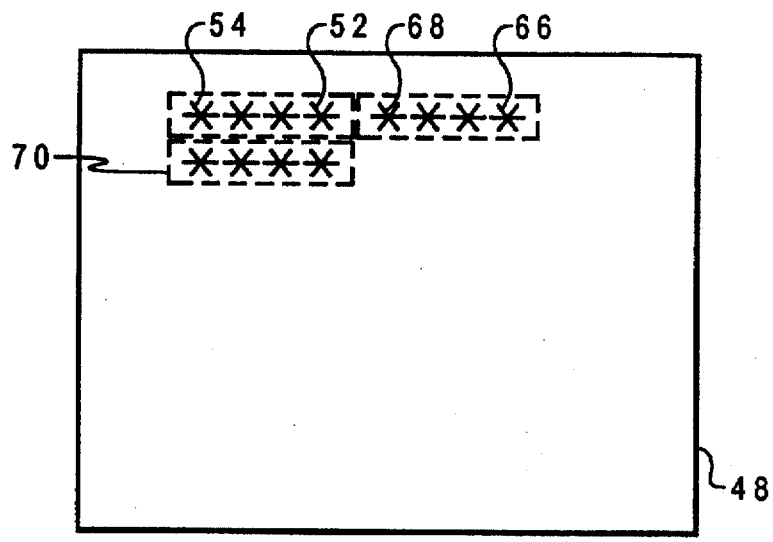
FIG. 3A shows storage to the frame buffer memory having an interface structure operating in the horizontal span interface mode, in accordance with a preferred embodiment of the present invention.

FIG. 3A shows the storage of the frame buffer memory having an interface structure operating in the horizontal span interface mode, in accordance with a preferred embodiment of the present invention. The four 8-bit pixels transferred over the data bus are configured into the designated pattern of four horizontal pixels along a span in input cache 44. This horizontal span 52 is stored in memory array 48 starting at the initial address received over the address bus. The first pixel in the span, pixel 54, is stored at this initial address. The next three pixels of the horizontal span 52, as compiled by input cache 44, are stored in the consecutive pixel storage locations along the row of the initial address.

Figure 3B:
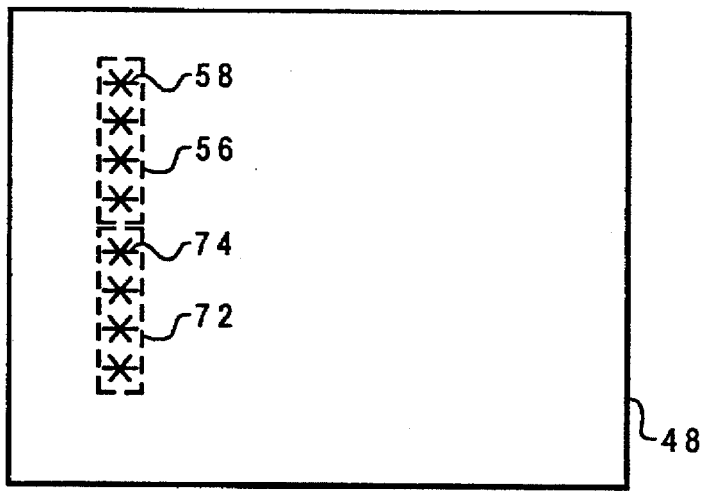
FIG. 3B shows storage to the frame buffer memory having an interface structure operating in the vertical span interface mode, in accordance with a preferred embodiment of the present invention.

FIG. 3B shows the storage of the frame buffer memory having an interface structure operating in the vertical span interface mode, in accordance with a preferred embodiment of the present invention. The four 8-bit pixels received over the data bus are compiled into the vertical span 56 by input cache 44 and then are stored in memory array 48 at the initial address received over the address bus. The first pixel, pixel 58, of the vertical span 56 is stored at the initial address. The remaining three pixels of the vertical span are stored in consecutive pixel memory locations in the column of the initial address.

Figure 3C:
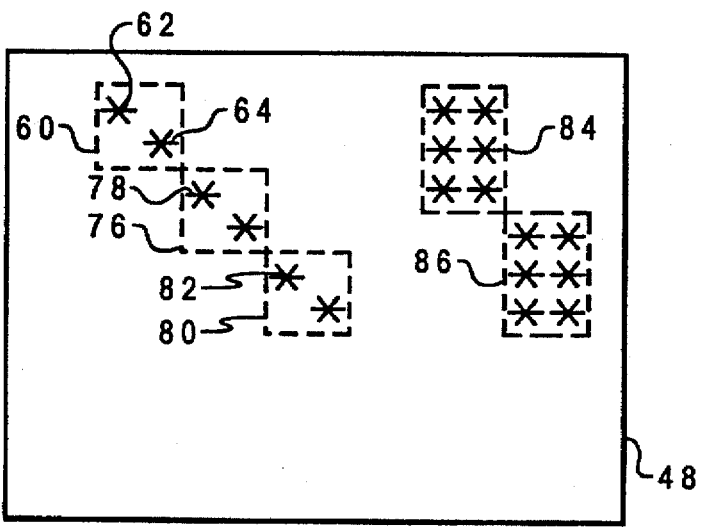
FIG. 3C shows storage to the frame buffer memory having an interface structure operating in the array interface mode, in accordance with a preferred embodiment of the present invention.

FIG. 3C shows the storage of the frame buffer memory having an interface structure operating in the array interface mode, in accordance with a preferred embodiment of the present invention. The four 8-bit pixels received over the data bus are compiled by input cache 44 into a N×M array-in this example, a 2×2 array. This first set of pixel data, array 60, is stored in memory array 48 such that pixel 62 is stored at the initial address. In this example, only two pixels, pixel 62, 64, have color pixel data. The remaining two pixels of array 60 have not had pixel data stored to these locations (i.e., they are blank pixels on the display).

Thereafter, until controller 46 receives a new interface mode signal or latch 50 receives a new address, the interface structure of the present invention operates in a strobed manner of operation. With each new set of pixel data transferred over data bus 21, a X strobe signal and/or a Y strobe signal is transferred over the control signal bus 23 to controller 46. The interface structure of the present invention will store the received set of pixel data in the memory array in response to the received strobe signals in a pattern that is a function of the current interface mode. In accordance with the present invention, the activation of the X or Y strobe increments the internal address counters (X address counter, Y address counter) by values as shown in the following table:

TABLE

| MODE | X strobe | Y strobe |
| --- | --- | --- |
| Horizontal span | X address + data width | Y address + 1 |
| Vertical span | X address + 1 | Y address + data width |
| Array (N × M) | X address + N | Y address + M |

The present invention provides independent control over the X address and Y address. One or both of the X and Y strobes could be active with a single transfer, causing one or both addresses to be updated. If one of the X or Y counters is not updated, the new set of pixel data is stored using the same X or Y address as the previous set of pixel data for the counter that is not updated.

Accordingly, referring back to FIG. 3A, a second set of pixel data 66 has been received over the data bus 21 following horizontal span 52. The four 8-bit pixels are compiled into the horizontal span 66. Only an X strobe has been received and so the X counter has been incremented by the X increment for the horizontal span mode. The Y address counter is held "constant". This X increment is equal to the data width of the data bus transferring the set of pixel data, as seen in the Table. As will be appreciated, the "data width" is determined based on the type of memory addressing used by memory array 48. If the memory array is addressed per byte or per pixel, or some other unit, instead of per bit, the data width of the data bus would be determined using the same unit. Generally, the address counters will be incremented by a power of two. In this example, the 32-bit data bus transfers four 8-bit pixels. Therefore, the X address counter is updated by adding the data width of the data bus (32 bits) to the current X address in the address counter. The first pixel, pixel 68, of the horizontal span 66 is stored at this new X address (i.e., 4 pixels along the span) and at the same Y address (i.e., the same row). As will be appreciated, as succeeding sets of pixel data are received, an associated X strobe or Y strobe will step the X and Y address counters. An X strobe signal will continue to store the pixels along the horizontal span in memory array 48.

The Y increment associated with the horizontal span interface mode is "one" indicating a single vertical pixel or row in the memory array. Thus, for example, if the next set of pixel data received after horizontal span 52 had an associated Y strobe instead of a X strobe, the horizontal span of 4 pixels would be stored in memory array 48 at a memory location having the same X address as horizontal span 52 but a Y address incremented by one row. This would produce horizontal span 70, as shown in FIG. 3A (in memory array 48, a positive increment of a row or Y address is downward in the figure). Also, as will be appreciated, an angled line can be formed on the display by storing a plurality of spans with a given pattern of X and Y strobes. For example, if every span is received with a X strobe and every fourth span is also received with a Y strobe, the line of pixels would angle down across the memory (and the display), with groups of four spans stepping down a row at a time.

As shown in FIG. 3B, vertical span 72 has been received with an associated Y strobe signal following vertical span 56. While operating in the vertical span interface mode, the interface structure of the present invention will increment the Y address counter by the address bus data width for a set of pixel data received with an associated Y strobe. Therefore, the first pixel 74 of vertical span 72 is stored at the memory address indicated by the previous X address (pixel 58) and the Y address of the previous pixel (pixel 58) plus the address bus data width of 32 bits (4 pixels) The remaining pixels being stored in the designated pattern for the vertical span mode. It will be appreciated that succeeding sets of pixel data received with an associated Y strobe will be stored in memory array 48 at memory locations incremented by 4 pixels in the vertical direction for each Y strobe to continue the vertical span along the line formed by vertical spans 56, 72.

As seen in FIG. 3C, the set of pixels received following array 60 are compiled into an array pattern as indicated by the mode signal and then stored in memory array 48 as indicated by the X and Y strobe signals. In this example, array 76 (two colored pixels and two pixels not changed) is received with an associated X strobe and an associated Y strobe. Accordingly, the X address counter, previously stored with the X address of pixel 62, is incremented by the horizontal length (N) of the array 60. The Y address counter, previously stored with the Y address of pixel 62, is incremented by the vertical length (M) of array 60. In this example, pixel 78 is stored in a location offset from pixel 62 by two pixels in the horizontal direction and two pixels in the vertical direction. The remaining pixels of the array are stored in the designated pattern as compiled for this particular array mode (i.e., 2×2) relative to the primary pixel 78.

Thereafter, the next succeeding set of pixels is array 80 with an associated X strobe and Y strobe. The primary pixel 82 is stored at a memory location addressed by the X address of pixel 78 plus the X increment associated with the array interface mode (N) and a Y address equal to the Y address of pixel 78 plus the Y increment associated with the array interface mode (M). Subsequent pixel arrays could be transferred to the interface structure using both an X and Y strobe to continue the diagonal line of pixels.

As an alternative example of the array interface mode, consider pixel arrays 84 and 86. These pixel arrays are received at the interface structure of the present invention in an array mode defined by N=2 and M=3. In this case, each set of pixel data received over data bus 21 contains 6 pixels. As indicated by the array mode signal over control bus 23, controller 46 commands input cache 44 to compile each pixel array in a 2×3 array. Pixel array 84 is then stored in memory array 48 at the initial address transferred on address bus 25. The next succeeding pixel array 86 is received with an associated X strobe and an associated Y strobe. Pixel array 86 is then stored in memory array 48 at the location addressed by the incremented address counters. In this case, the X address counter is incremented by two pixels and the Y address counter is incremented by 3 pixels.

As can now be appreciated, the two dimensional frame buffer memory interface structure of the present invention significantly increases the bandwidth across the interface and enhances the performance of a frame buffer memory. As described in the preferred embodiment of the present invention, a multiple number of pixels may be transferred and stored to the frame buffer memory simultaneously using this interface structure. In each of the three modes of operation, a set of pixels (4 pixels) are compiled and stored as a single set using a single address. Moreover, after the initial address has been transferred to the frame buffer memory interface, only two strobe signals of a single data pulse are needed to define the storage location of succeeding sets of pixels. In can be seen that the present invention significantly increases the bandwidth of the frame buffer interface and significantly enhances frame buffer memory performance by providing a two-dimensional interface structure.

The present invention can be particularly advantageous when operating in the array interface mode. For example, in the prior art, the formation of a diagonal line such as that formed by pixel arrays 60, 76, 80 in FIG. 3C would require the transfer of 6 separate sets of pixel data and 6 separate addresses (6 rows of data). The present invention has doubled the band width of the frame buffer memory interface structure by transferring and storing 2 pixels of the diagonal line simultaneously, using a single write operation. This results in only three transfers/writes to memory array 48. The example of pixel arrays 84, 86 shows how the two dimensional frame buffer memory interface structure of the present invention can triple the bandwidth. In that case, 12 pixels were stored to memory array 48 using two write operations, while some conventional interface structures would require six or more write operations.

Figure 4:
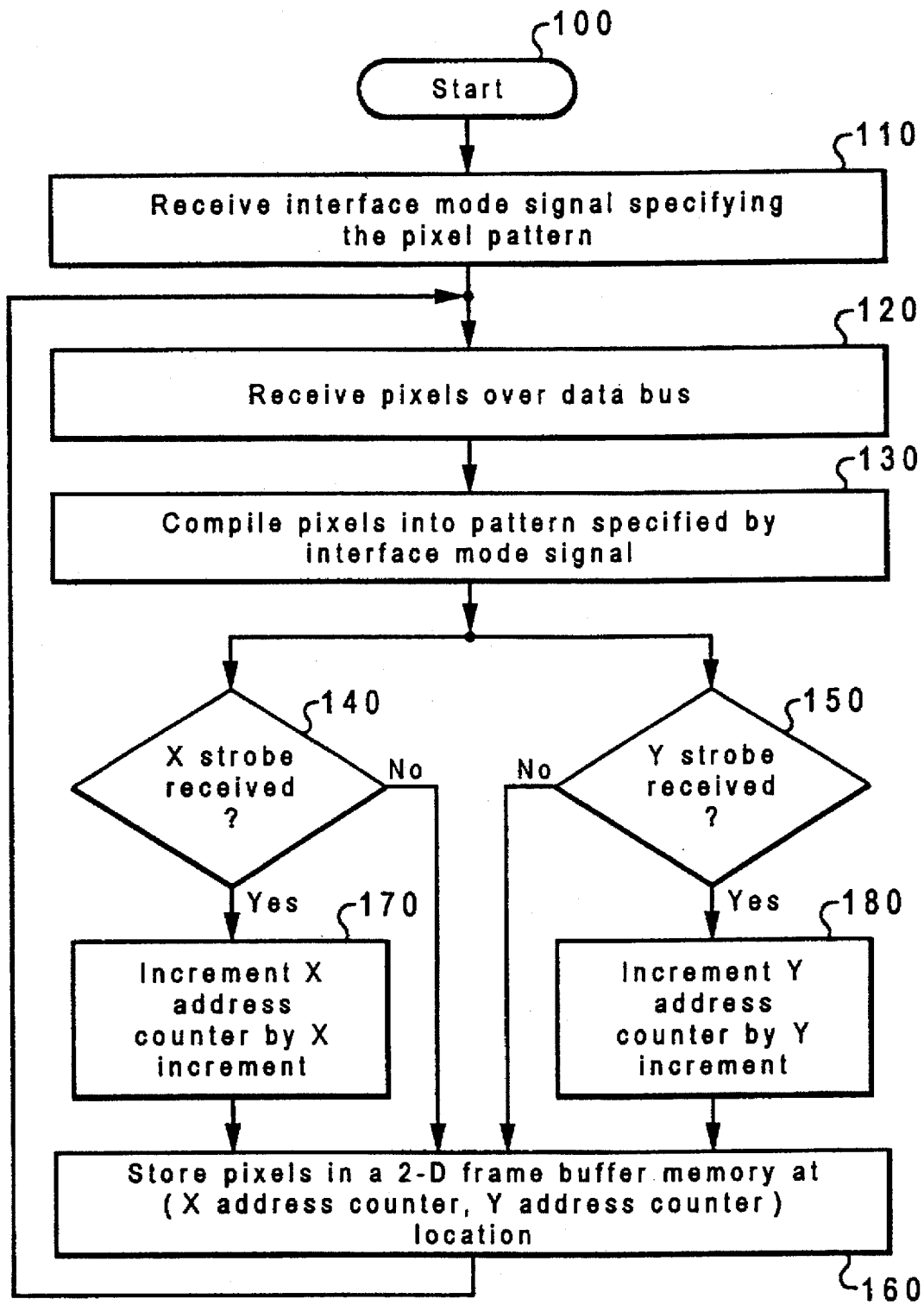
FIG. 4 shows a flowchart of the method of transferring two dimensional data over a two dimensional interface structure to a frame buffer memory, in accordance with a preferred embodiment of the present invention.

Referring now to FIG. 4, there is shown a flowchart of the method of transferring two dimensional data to a frame buffer memory, in accordance with a preferred embodiment of the present invention. The process starts at step 100 and proceeds to step 110 where the interface structure on the two dimensional frame buffer memory receives a mode signal from the graphics processor specifying a pixel pattern for the pixel data being transferred over the data bus. At step 120, a data cache in the frame buffer memory receives pixels over the data bus. Also, if this is a new set of pixel data, an initial address is also transferred to the frame buffer memory over an address bus.

The process proceeds to step 130 where the received pixels are compiled into a pattern specified by the interface mode signal. This designated pattern is a function of the interface mode. For the horizontal span mode, a line of pixels equal to the number of pixels (or enables) transferred over the data bus are compiled into a horizontal line. In the vertical span mode, the number of pixels (or enables) transferred over the parallel data bus are compiled into a vertical line. If the frame buffer interface is operating in the array mode, the pixel data is compiled into a designated pattern of N×M pixels.

The process then proceeds to decision blocks 140, 150. If a X strobe is received as determined at decision block 140, the process proceeds to step 170 where the X address counter, which is used as the X address for store operations to the frame buffer memory, is incremented by an X increment that is a function of the interface mode. The process then proceeds from step 170 or decision block 140, if the determination is negative, to step 160. At decision block 150, it is determined whether a Y strobe has been received. If a Y strobe is received, the process proceeds to step 180 where the Y address counter, which is used as the Y address for a store operation to the frame buffer memory, is incremented by a Y increment that is a function of the interface mode. The process then proceeds from step 180, or from decision block 150, if the determination is negative, to step 160. In a preferred embodiment, the X increment and Y increment for the various modes of operation are those described in the Table above.

At step 160, the received pixels are stored in the two dimensional frame buffer memory in the designated pattern for the current interface mode at the address specified by the X address counter and Y address counter, after any possible update to the counters at steps 170 and 180. Thereafter, the process returns to step 120 to await the receipt of the next set of pixel data to be stored in the frame buffer memory.

While the invention has been particularly shown and described with reference to a preferred embodiment, it will be understood by those skilled in the art that various changes in form and detail may be made therein without departing from the spirit and scope of the invention.

What is claimed is:

1. A two dimensional frame buffer memory interface structure comprising:

a parallel data bus that transfers a set of pixel data in parallel, said set of pixel data specifying data for a plurality of pixels in a display image;

a control signal bus that transfers an X strobe signal, a Y strobe signal, and a mode signal indicating an interface mode specifying a designated pattern for the pixel data transferred over the parallel data bus;

a controller connected to the control signal bus that receives the X strobe signal, the Y strobe signal, and the mode signal; and a data cache, controlled by the controller and connected to the parallel data bus, that compiles each set of pixel data received over the parallel data bus into the designated pattern indicated by the mode signal;

wherein the controller transfers each set of pixel data from the data cache to a two dimensional frame buffer for storage in the designated pattern at a respective location, each location in the two dimensional frame buffer having an address including an X address and a Y address, wherein the address of the location of a given set of pixel data includes an X address equal to the X address of a location of a previous set of pixel data plus, when an X strobe signal is received for the given set of pixel data, an X increment associated with the indicated interface mode, and a Y address equal to a Y address of the location of the previous set of pixel data plus, when a Y strobe signal is received for the given set of pixel data, a Y increment associated with the indicated interface mode.

2. A two dimensional frame buffer memory interface structure according to claim 1, wherein the indicated interface mode is a horizontal span mode having an X increment equal to a data width of the parallel data bus and a Y increment equal to one, and wherein the designated pattern is a linear horizontal line of pixels.

3. A two dimensional frame buffer memory interface structure according to claim 1, wherein the indicated interface mode is a vertical span mode having an X increment equal to one and a Y increment equal to a data width of the parallel data bus, and wherein the designated pattern is a linear vertical line of pixels.

4. A two dimensional frame buffer memory interface structure according to claim 1, wherein the indicated interface mode is an array mode having an X increment equal to N and a Y increment equal to M, and wherein the designated pattern is an array of pixels that is N units in an X direction and M units in a Y direction, and further wherein the data width is equal to N×M.

5. A two dimensional frame buffer memory interface structure according to claim 4, wherein a unit is a pixel.

6. A two dimensional frame buffer memory interface structure according to claim 4, wherein a unit is a bit.

7. A two dimensional frame buffer memory interface structure according to claim 1, further comprising an address bus that transfers an initial address for the pixel data transferred by the parallel data bus, wherein the initial address includes an initial X address and an initial Y address, and wherein a first set of pixel data transferred over the parallel data bus is stored in the two dimensional frame buffer at the location specified by the initial X address and the initial Y address.

8. A two dimensional frame buffer memory interface structure according to claim 1, said plurality of pixels including n pixels, wherein the parallel data bus transfers n enable bits that each correspond to a respective one of said n pixels, and wherein the data cache compiles the n pixels into the designated pattern by setting a given pixel to a first color for a first state of the corresponding enable bit and setting the given pixel to a second color for a second state of the corresponding enable bit.

9. A method of transferring two dimensional data to a frame buffer memory, the method comprising the steps of:

receiving a mode signal indicating an interface mode specifying a designated pattern for pixel data transferred over a parallel data bus;

receiving, over the parallel data bus, a set of pixel data specifying data for n pixels of a display image, n being greater than 1;

compiling the set of pixel data received over the parallel data bus into the designated pattern, as indicated by the mode signal; and transferring the compiled set of pixel data to a two dimensional frame buffer for storage, in the designated pattern, at a location specified by an address including an X address and a Y address;

wherein the address of the location includes an X address equal to the X address of a previous set of pixel data plus, if an X strobe signal is received, an X increment associated with the indicated interface mode, and a Y address equal to a Y address of the previous set of pixel data plus, if a Y strobe signal is received, a Y increment associated with the indicated interface mode.

10. A method of transferring two dimensional data to a frame buffer memory according to claim 9, wherein the indicated interface mode is a horizontal span mode having an X increment equal to a data width of the parallel data bus and a Y increment equal to one, and wherein the designated pattern is a linear horizontal line of pixels.

11. A method of transferring two dimensional data to a frame buffer memory according to claim 9, wherein the indicated interface mode is a vertical span mode having an X increment equal to one and a Y increment equal to a data width of the parallel data bus, and wherein the designated pattern is a linear vertical line of pixels.

12. A method of transferring two dimensional data to a frame buffer memory according to claim 9, wherein the indicated interface mode is an array mode having an X increment equal to N and a Y increment equal to M, and wherein the designated pattern is an array of pixels that is N units in an X direction and M units in a Y direction, and further wherein the data width is equal to N×M.

13. A method of transferring two dimensional data to a frame buffer memory according to claim 12, wherein a unit is a pixel.

14. A method of transferring two dimensional data to a frame buffer memory according to claim 12, wherein a unit is a bit.

15. A method of transferring two dimensional data to a frame buffer memory according to claim 9, further comprising an address bus that transfers an initial address for the pixel data transferred by the parallel data bus, wherein the initial address includes an initial X address and an initial Y address, and wherein a first set of pixel data transferred over the parallel data bus is stored in the two dimensional frame buffer at the location specified by the initial X address and the initial Y address.

16. A method of transferring two dimensional data to a frame buffer memory according to claim 9, wherein the parallel data bus transfers n enable bits that each correspond to a respective one of the n pixels, and wherein the data cache compiles the n pixels into the designated pattern by setting a given pixel to a first color for a first state of the corresponding enable bit and setting the given pixel to a second color for a second state of the corresponding enable bit.

17. A frame buffer memory system that receives and stores two dimensional data, comprising:
 a parallel data bus that transfers a set of pixel data in parallel, said set of pixel data specifying data for a plurality of pixels in a display image;
 a control signal bus that transfers an X strobe signal, a Y strobe signal, and a mode signal indicating an interface mode specifying a designated pattern for the pixel data transferred over the parallel data bus;
 a controller connected to the control signal bus that receives the X strobe signal, the Y strobe signal, and the mode signal;
 a data cache, controlled by the controller and connected to the parallel data bus, that compiles each set of pixel data received over the parallel data bus into the designated pattern indicated by the mode signal; and
 a two dimensional frame buffer, wherein each location in said two dimensional frame buffer has an address including an X address and a Y address;

wherein the controller transfers each set of pixel data from the data cache to the two dimensional frame buffer for storage in the designated pattern at a respective location, the address of the location of a given set of pixel data includes an X address equal to the X address of a previous set of pixel data plus, when a X strobe signal is received for the given set of pixel data, an X increment associated with the indicated interface mode, and a Y address equal to a Y address of the location of the previous set of pixel data plus, when a Y strobe signal is received for the given set of pixel data, a Y increment associated with the indicated interface mode.

18. A frame buffer memory system that receives and stores two dimensional data according to claim 17, wherein the indicated interface mode is a horizontal span mode having an X increment equal to a data width of the parallel data bus and a Y increment equal to one, and wherein the designated pattern is a linear horizontal line of pixels.

19. A frame buffer memory system that receives and stores two dimensional data according to claim 17, wherein the indicated interface mode is a vertical span mode having an X increment equal to one and a Y increment equal to a data width of the parallel data bus, and wherein the designated pattern is a linear vertical line of pixels.

20. A frame buffer memory system that receives and stores two dimensional data according to claim 17, wherein the indicated interface mode is an array mode having an X increment equal to N and a Y increment equal to M, and wherein the designated pattern is an array of pixels that is N units in an X direction and M units in a Y direction, and further wherein the data width is equal to N×M.

21. A frame buffer memory system that receives and stores two dimensional data according to claim 20, wherein a unit is a pixel.

22. A frame buffer memory system that receives and stores two dimensional data according to claim 20, wherein a unit is a bit.

23. A frame buffer memory system that receives and stores two dimensional data according to claim 17, further comprising an address bus that transfers an initial address for the pixel data transferred by the parallel data bus, wherein the initial address includes an initial X address and an initial Y address, and wherein a first set of pixel data transferred over the parallel data bus is stored in the two dimensional frame buffer at the location specified by the initial X address and the initial Y address.

24. A frame buffer memory system that receives and stores two dimensional data according to claim 17, said plurality of pixels including n pixels, wherein the parallel data bus transfers n enable bits that each correspond to a respective one of said n pixels, and wherein the data cache compiles the n pixels into the designated pattern by setting a given pixel to a first color for a first state of the corresponding enable bit and setting the given pixel to a second color for a second state of the corresponding enable bit.

* * * * *